Jan. 26, 1960  J. B. CRAFT  2,922,600
AUTOMATIC GUIDANCE SYSTEM
Filed April 18, 1956
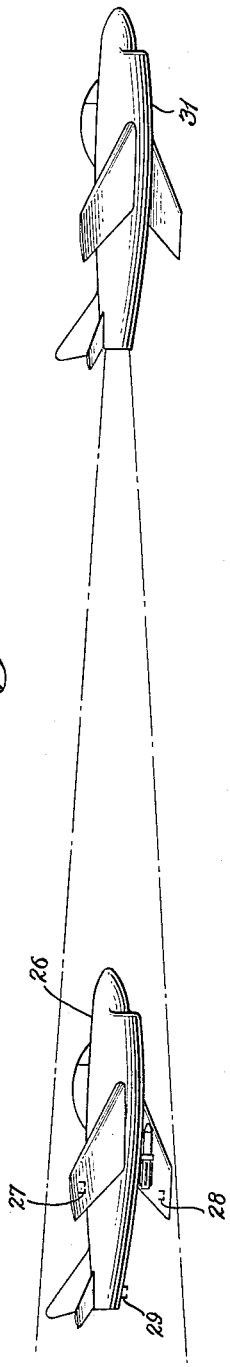
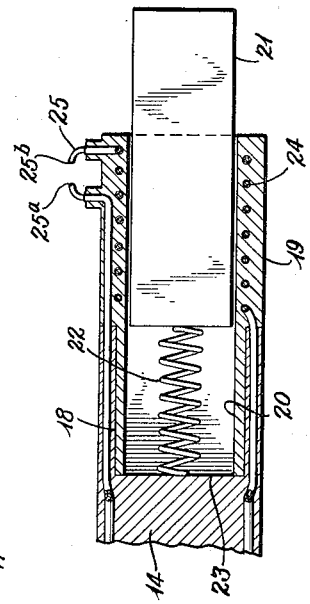
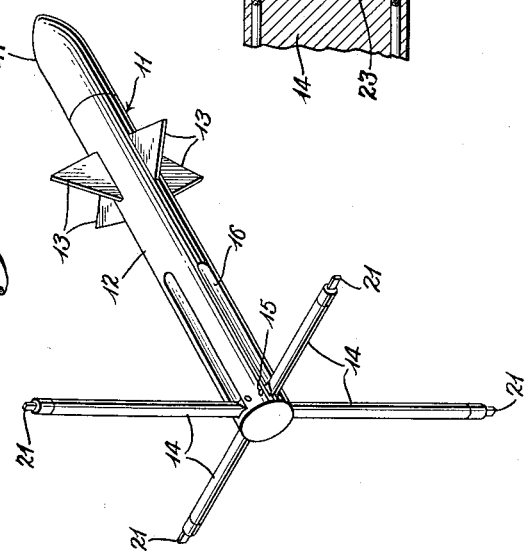
INVENTOR
*John B. Craft*
BY *Burns, Doane, Benedict & Irons*
ATTORNEYS

United States Patent Office 2,922,600
Patented Jan. 26, 1960

2,922,600

AUTOMATIC GUIDANCE SYSTEM

John B. Craft, Los Angeles, Calif.

Application April 18, 1956, Serial No. 578,914

7 Claims. (Cl. 244—14)

This invention relates generally to vehicles adapted for movement through a fluid medium and, more particularly, to automatic guidance systems for such vehicles.

The demand for aircraft and guided missiles, such as air-to-air and air-to-surface rockets, having ever-increasing speeds coupled with the demand for great accuracy has placed a burden on the aircraft and missile development program to create highly efficient guidance systems. An especially difficult problem is to provide guidance systems which will cause a rocket or the like to home in on either stationary or moving targets, changing course if necessary after the initial aiming and firing. In the past, missiles have been provided with radar or similar equipment to correct their courses toward their targets after launching. This equipment is, of course, heavy, expensive, and complex. It is easily damaged and requires frequent maintenance. In some instances, guidance systems which are completely pre-set before launching have been provided. In other instances, no guidance system at all is used; but reliance is placed entirely on proper aiming technique. Such systems are, of course, disadvantageous in that there is no provision for in-flight correction of aiming errors and no provision for changing course to follow a maneuvering target.

To overcome the disadvantages of the prior art, it is a primary object of this invention to present a vehicle adapted for guided movement through a fluid medium having a light economical guidance control mechanism simple in operation and responsive to the degree of electrical conductivity of the surrounding medium.

It is another object of this invention to provide such a vehicle having electrically actuated directional control means regulated by a plurality of sensing elements spaced around the vehicle so as to be exposed to the surrounding medium and responsive to the electrical conductivity thereof.

It is a further object of this invention to provide a new and improved guidance system for a missile having simple, economical means to maintain the missile within a stream of ionized fluid emanating from a target so that the missile is guided toward the target.

Generally stated, the invention constitutes a vehicle adapted for guided movement through a fluid medium which comprises a body, directional control means carried by the body, electrically actuated power means for operating the control means, and a plurality of sensing elements responsive to the electrical conductivity of the surrounding medium to control the power means, the sensing elements being carried by the body so as during movement of the vehicle to be exposed to the surrounding medium at positions radially outward from and circumferentially spaced around the axis of movement of the body.

The guidance system in accordance with this invention is used to direct a vehicle through the air to a target from which is emanating an ionized stream of fluid. The guidance system will maintain the vehicle within the confines of the ionized stream and thus cause the vehicle to home in on the target.

The objects set forth hereinbefore and others will be apparent from the detailed description of the invention set forth hereinafter and the drawing in which:

Figure 1 is a perspective view of an attacking aircraft following in the jet stream of a target aircraft and carrying a rocket in accordance with this invention;

Figure 2 is a perspective view of a rocket according to the invention shown in more detail; and Figure 3 is a fragmentary sectional view showing the end portion of one of the rocket fins embodying a control mechanism and sensing element according to the invention.

There is shown in Figure 2 an air-to-air rocket designated generally by the reference numeral 11 having a body 12, four stabilizing fins 13, and four elongated fins 14. The purpose of the elongated fins 14 is to provide support for the sensing elements and control means of the guidance system. The elongated fins 14 are pivotally mounted by means of hinged connections 15 to the body 12 which is provided with elongated recesses 16 to house for storage purposes the fins 14 when they are folded inwardly against the body. It will be understood that the fins 14 and the hinged connections 15 are shown schematically only to the extent necessary for a complete understanding of the invention. The fins 14 may take the shape of air foils to assist in the stabilization of the rocket during flight. However, since the sensing elements are preferably supported at as great a distance radially outwardly of the axis of flight as possible for the reason explained more fully hereinafter, it may be desirable to construct the elongated fins of long slender rods as shown in Figure 2. In such a case, the rocket would be stabilized during flight by the fins 13. The rocket is further provided with a warhead 17 which carries high explosives in the usual manner.

The outer end of each of the fins 14 is provided with a recess 18 in which is rigidly mounted the guidance mechanism housing 19 which is provided with an elongated recess 20 in which is slidably mounted a drag member 21 which in turn constitutes a directional control member for the guidance system. The drag member 21 is constructed of iron or other magnetic material and is normally held retracted within the recess 20 by resilient tension spring 22 which is fixed between the drag member 21 and the inner wall 23 of recess 18. Surrounding the drag member 21 is an electrical coil 24 which is connected in series with a sensing element 25 to a suitable source of electricity, such as a battery (not shown), located within the body 12. The sensing element 25 comprises a pair of spaced probes 25a and 25b which are exposed to the medium surrounding the rocket 11. However, it will be understood that other types of sensing elements responsive to the degree of electrical conductivity of the surrounding medium might be used. When a high voltage is impressed upon the sensing element 25 by the source of electricity within the body 12, there will normally be no flow of current across the space between the probes 25a and 25b because the air in this space constitutes a dielectric. However, when an ionized fluid passes between these probes, the electrical conductivity of the medium in the space is increased; and current from the source of electricity flows across the space between the probes, through the coil 24 and back to the source. Thus the coil 24 projects the drag member 21 outwardly into the surrounding medium to increase the aerodynamic drag at the end of the fin 14. Preferably, the fins 14 are as long as possible consistent with effective aerodynamic characteristics because the sensitivity of the guidance system is a function of the radial distance between the sensing elements 25 and the flight axis of the body 12. As shown in Figure 1, the rocket 11 is attached to an aircraft 26 to be fired therefrom. To facilitate the mounting of the rocket, the fins 14 are folded and held inwardly by the supporting structure on the aircraft 26. After firing, the fins 14 are opened to the extended position by the drag of the air flowing past the moving rocket and preferably locked in this position. The aircraft 26 is provided with sensing elements 27 and 28 located on the underside of the wings near the outer ends thereof and sensing element 29 located on the underside of the rear portion of the fuselage. The sensing elements 27, 28 and 29 all comprise spaced probes similar to the probes 25a and 25b and are connected in any suitable manner to a signal in the cockpit of the aircraft to actuate the signal only when current is flowing between the probes in each of the sensing elements 27, 28 and 29. One system for accomplishing this includes three relays. One of the relays is connected in series with sensing element 27; the second relay is connected in series with sensing element 28; and the third relay is connected in series with sensing element 29. Each of the relays operates a switch, and the three switches are connected in series with the signal in the cockpit. Thus, before the signal is actuated, it is necessary that current be flowing across the space between the probes of each of the sensing elements 27, 28 and 29.

When the aircraft 26 is flying a pursuit course and situated within the confines of the ionized jet stream emanating rearwardly from a target jet, current will flow across the space between the probes of each of the sensing elements 27, 28 and 29 and the cockpit signal light will be actuated. The rocket 11 is fired toward the target, and the fins 14 open outwardly. A high voltage from the source of electricity within the body 12 is impressed on the sensing elements 25 on each of the fins 14. When all of the sensing elements 25 are within the ion stream, all the drag members 21 will project outwardly an equal amount so that the drag on each of the fins 14 is identical. As a result of this balanced condition, there will be no change in the course of the rocket 11. However, if the rocket begins to move out of the ionized jet stream so that one of the sensing elements 25 enters an area of decreased ionization and consequently decreased electrical conductivity, the current flow between the probes of this sensing element and thus through the coil 24 is decreased and the spring 22 overcomes the force of the coil 24 to retract the drag member 21. This, of course, decreases the drag on the end of the fin 14 in the zone of decreased ionization, and the rocket moves toward the zone of greater ionization. When the sensing elements are all situated once again in areas of equal ionization, the drag members 21 again occupy identical positions so that balanced drag on the various fins is restored. Thus, despite slight errors in launching attitude or target maneuvering, the sensing and control elements of the rocket automatically effect a constant correction of this course to maintain the vehicle within the jet stream of the target, thus greatly enhancing the possibility of a kill. Because of the accurate guidance control of the rocket, it may be launched into the ionized jet stream at a much greater range from the target than would be possible if no homing feature is embodied in the rocket.

It will be understood that the various sensing elements 25 and control members 21 may be operatively connected in different ways. For example, the sensing element 25 on one fin might be connected to the coil 22 on the diametrically opposite fin. With this arrangement, the guidance mechanism would be so constructed that the drag members were each normally extended by a resilient member and would be retracted by the coils when the sensing elements were positioned in an ionized stream. Thus, when a sensing element is moved into an area of decreased ionization, the drag member on the opposite fin is extended by the resilient member to increase the drag thereon and the missile moves toward the zone of increased ionization. Further, the sensing elements may be operatively associated with suitable control surfaces located on any part of the missile not necessarily on the fins on which the sensing elements are mounted.

While the invention has been described with particular reference to an air-to-air rocket, it will be apparent that it can be used in connection with a variety of vehicles adapted for guided movement through a fluid medium. For example, rockets or glide bombs equipped with the guidance control mechanism of this invention could be directed toward jet aircraft, ships, trains, or any other vehicle emitting an ionized exhaust; factories emitting ionized smoke; artillery positions because of the ionized cone emitted with each firing; rocket launching positions because of the ionized trails leading back to the launching site after each firing; and various other targets from which ionized streams of fluid emanate. Further, a pair of sensing elements according to the invention might be employed with a piloted aircraft with the elements being positioned at opposite ends of the aircraft wing to control the power means operating conventional aircraft control surfaces to maintain the aircraft in an ionized stream. Thus, one aircraft could be made to automatically follow a lead aircraft in the jet stream thereof.

A further advantage of the guidance system of this invention is that it may be easily incorporated in existing aircraft or missiles and would in no way preclude their use in a conventional flight or unguided ballistic attack. Additional guidance is merely provided, should the homing characteristics of the invention be desirable.

There has been illustrated and described what is considered to be a preferred embodiment of the invention. However, it will be understood that various modifications may be made without departing from the broader scope of the following claims:

1. A vehicle adapted for guided movement through a fluid medium which comprises a body, directional control means carried by said body, electrically actuated power means for operating said control means, and a plurality of sensing elements responsive to the electrical conductivity of the surrounding medium to control said power means, said sensing elements being carried by said body mounted so as during movement of the vehicle to be exposed to the surrounding medium at positions radially outward from and circumferentially spaced around the axis of movement of said body.

2. A vehicle as recited in claim 1 wherein each of said sensing elements comprises a pair of spaced contact members.

3. A vehicle adapted for guided movement through a fluid medium which comprises a body, a plurality of elongated fins carried by said body spaced circumferentially around the flight axis thereof and mounted so as to extend radially outwardly therefrom during flight, directional control members carried by said fins, electrically actuated power means for operating said control members, and a plurality of sensing elements carried by said fins exposed during flight to the surrounding medium and responsive to the degree of ionization thereof to control said power means.

4. A vehicle as recited in claim 3 wherein said fins are foldable inwardly against said body.

5. A vehicle as recited in claim 3 wherein each of said sensing elements comprises a pair of spaced contact members.

6. A vehicle adapted for guided movement through the air which comprises a body, a plurality of elongated fins carried by said body spaced circumferentially around the flight axis thereof and mounted so as to extend radially outwardly therefrom during flight, directional control members carried by said fins and movable in the surrounding medium to vary the aerodynamic drag thereon, electrically actuated power means for operating said control members, and a plurality of spaced electrical probe sensing elements carried by said fins exposed during flight to the surrounding air and responsive to the electrical conductivity thereof to control said power means.

7. A missile adapted for guided movement through the air which comprises a body and four elongated fins carried by said body uniformly spaced circumferentially around the flight axis thereof and mounted so as to extend radially outwardly therefrom during flight; each of said fins having mounted therein a magnetic material control member slideably projectable into the surrounding air, resilient means to move the control member in one direction, an electric coil surrounding said control member to move the same in the opposite direction to vary the aerodynamic drag thereon, and a pair of spaced contact members exposed to the surrounding air; each of said pairs of contact members being electrically connected to one of said coils and to a source of electricity to effect current flow through the coil variable with the degree of ionization of the surrounding medium.

References Cited in the file of this patent

UNITED STATES PATENTS

| | | |
|---|---|---|
| 2,206,927 | Turnbull | July 9, 1940 |
| 2,505,042 | Gourdon | Apr. 25, 1950 |
| 2,520,433 | Robinson | Aug. 29, 1950 |
| 2,543,141 | Vichniersky | Feb. 27, 1951 |
| 2,710,899 | Marsden | June 14, 1955 |
| 2,715,815 | Malick | Aug. 23, 1955 |
| 2,737,356 | Varian | Mar. 6, 1956 |